US006465598B2

(12) United States Patent
Keute et al.

(10) Patent No.: US 6,465,598 B2
(45) Date of Patent: Oct. 15, 2002

(54) URETHANE RESINS

(75) Inventors: Joseph S. Keute, Blaine, MN (US); Anne-Marie Thunnissen, Minneapolis, MN (US); Robert J. Tweedy, Jr., Coon Rapids, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 09/792,999

(22) Filed: Feb. 26, 2001

(65) Prior Publication Data

US 2001/0007900 A1 Jul. 12, 2001

Related U.S. Application Data

(62) Division of application No. 09/089,530, filed on Jun. 3, 1998, now Pat. No. 6,218,500.

(51) Int. Cl.[7] ............................................... C08G 59/50
(52) U.S. Cl. ........................ 528/122; 528/123; 528/124; 528/407
(58) Field of Search ................................ 528/122, 123, 528/124, 407

(56) References Cited

U.S. PATENT DOCUMENTS

| 3,993,708 | A | * | 11/1976 | Brinkmann et al. | |
| 4,137,276 | A | | 1/1979 | Sirota | 428/413 |
| 4,190,567 | A | | 2/1980 | Ohmura et al. | 525/452 |
| 4,224,417 | A | | 9/1980 | Hajek et al. | 521/166 |
| 4,427,804 | A | | 1/1984 | Tortorello et al. | 5523/404 |
| 4,435,558 | A | | 3/1984 | Burba et al. | 528/45 |
| 4,489,179 | A | | 12/1984 | Tortorello | 523/420 |
| 4,705,841 | A | | 11/1987 | Tosh et al. | 528/59 |
| 4,772,643 | A | | 9/1988 | Ernst et al. | 523/414 |
| 4,861,825 | A | | 8/1989 | Ernst et al. | 524/839 |
| 4,956,402 | A | | 9/1990 | Perner et al. | 523/415 |
| 5,034,495 | A | | 7/1991 | Hansen et al. | 528/111 |
| 5,187,253 | A | | 2/1993 | Wolf | 528/49 |
| 5,219,975 | A | * | 6/1993 | Schmalstieg et al. | |
| 5,227,414 | A | | 7/1993 | Ernst et al. | 523/417 |
| 6,218,500 | B1 | | 4/2001 | Keute et al. | 528/49 |

* cited by examiner

Primary Examiner—Rachel Gorr
(74) Attorney, Agent, or Firm—Patterson, Thuente, Skaar & Christensen, P.A.; Peter S. Dardi

(57) ABSTRACT

Amine-terminated urethane oligomer compositions are described that include very high oligomer concentrations. The compositions are melts of the amine-terminated oligomers. The compositions can include one or more property modifiers. The compositions are useful in the formation of crosslinked copolymers, especially with epoxy resins. The resulting copolymers are useful in the formation of coatings.

20 Claims, No Drawings

URETHANE RESINS

This is a divisional of copending application of Ser. No. 09/089,530, filed on Jun. 3, 1998, which has now issued as U.S. Pat. No. 6,218,500.

FIELD OF THE INVENTION

The invention relates to compositions comprising urethane resins, in particular, amine-terminated urethane oligomers. The invention further relates to polymers prepared by combining urethane oligomers with crosslinking agents and to coatings formed from the resulting polymers.

BACKGROUND OF THE INVENTION

Polyurethanes are used in a variety of commercial applications for the production of products such as fibers, adhesives, coatings, elastomers and foams. Polyurethane coatings can have desirable properties including high gloss, chemical resistance and abrasion resistance. Preferred urethane coatings also display flexibility, impact resistance, and toughness. For use as coatings, the composition must be prepared in a form that can be spread on the relevant surface. The curing or crosslinking process then completes polymer formation as any remaining volatiles evaporate.

Urethane coatings can be supplied in the form of a two component formulation, where the two components are mixed prior to application to a surface. One component includes urethane oligomers with suitable functional groups available for crosslinking. The second component includes a crosslinking agent that can react with the functional groups of the urethane oligomers.

SUMMARY OF THE INVENTION

The present invention involves the formation of compositions with very high concentrations of amine-terminated urethane oligomers. The oligomers of compositions generally are unsolvated. The compositions can include plasticizers, viscosity modifiers and other additives. The compositions generally have sufficiently low viscosities such that they can be blended with appropriate crosslinking compositions to form desirable polymers. The high solid, urethane oligomer compositions have improved properties for the formation of coatings. In particular, the polymer compositions can be applied in relatively thick layers without hindering the curing process to form high quality coatings.

In a first aspect, the invention features a composition including greater than about 55 percent by weight amine-terminated urethane oligomers. In selected embodiments the composition includes from about 60 percent to about 90 percent by weight amine-terminated urethane oligomers. In other embodiments the composition includes from about 65 percent to about 80 percent by weight amine-terminated urethane oligomers.

The composition can further include an aqueous viscosity modifying agent. The aqueous viscosity modifying agent can include greater than about 30 percent by weight volatile alcohol. The composition also can include volatile organic acids, with the composition preferably comprising less than about 10 percent and more preferably less than about 1 percent by mole equivalent of carboxylate groups of the volatile organic acids relative to amine groups of the amine-terminated urethane oligomers. The amine-terminated urethane oligomers can include primary amine-terminated oligomers. The amine-terminated urethane oligomers can include multifunctional amine moieties bonded at secondary amine sites to isocyanate functional groups of a urethane oligomer to form carbamate linkages. Suitable multifunctional amine moieties include N-(aminoethyl) piperazine moieties.

In another aspect, the invention features a kit including:
a) a composition comprising greater than about 55 percent by weight amine-terminated urethane oligomers; and
b) a polyepoxide compound in a container separate from the composition comprising amine-terminated urethane oligomers.

The polyepoxide can be a polyglycidyl ether of a polyphenol, a polyglycidyl ether of aliphatic polyol with 2 to 4 hydroxyl groups, or mixtures thereof. The ratio of active hydrogens in amine functional groups to epoxide groups preferably ranges from about 1:1 to about 1.75:1.

In another aspect, the invention features a method of producing an amine-terminated urethane oligomer composition comprising the steps of
a) adding water to a polyketimine functionalized urethane oligomer; and
b) removing ketone to form a composition comprising greater than about 55 percent by weight amine-terminated urethane oligomer.

In another aspect, the invention features a polymer coating including an epoxy crosslinked amine-terminated urethane polymer, the coating being formed by curing a mixture of polyepoxides and a composition comprising greater than about 55 percent by weight amine-terminated urethane oligomers.

In another aspect, the invention features a method of forming a coating comprising the steps of spreading a mixture on a surface such that it can cure, the mixture obtained by mixing polyepoxides with a composition comprising greater than about 55 percent by weight amine-terminated urethane oligomers. The surface can be concrete and can form a wall or a floor.

Other features and advantages of the invention follow from the detailed description of the invention and claims below.

DETAILED DESCRIPTION

Novel compositions include surprisingly high proportions of amine-terminated urethane oligomers while generally exhibiting suitable rheological properties. Amine-terminated urethane oligomers have amine functional groups available for further reaction with, for example, a crosslinking agent. The novel compositions generally are room temperature "melts" (i.e., flowable polymer compositions where the polymer is not dissolved in a solvent) that may include viscosity modifiers to reduce the viscosity for easier handling. Some of these compositions have qualitatively different properties than compositions involving aqueous emulsions of amine-terminated urethane oligomers. The improved compositions have excellent properties conducive to the formation of coatings upon mixing with a crosslinking agent.

The formation of the amine-terminated urethane oligomers first involves generation of an isocyanate functional urethane oligomer by the reaction of a polyisocyanate compound with a compound having active hydrogens such as a polyol, an amine or a thiol. The isocyanate functional urethane oligomer is then reacted with a compound having a single active hydrogen and at least one protected primary amine group. The protected amine group generally involves a ketimine formed by reacting a ketone with the primary amine. After completing formation of the ketimine terminated urethane oligomer, the ketimine can be hydrolyzed to form the amine-terminated urethane oligomer.

The amine-terminated urethane oligomers can be crosslinked at the amine functional groups to form polymers. Preferred crosslinking agents include epoxy resins and acrylates. The resulting polymer can have the advantageous properties of a polyurethane together with other properties contributed by the crosslinking agent.

An amine-terminated urethane oligomer composition has several advantages over compositions with corresponding oligomers in aqueous emulsions. For example, the higher solid concentration means that a smaller volume is required to hold an equivalent amount of oligomer. Furthermore, significant quantities of volatile organic acids used to form the aqueous emulsion are not needed. The volatile organic acids slow the curing process since they must evaporate to permit the crosslinking reaction to proceed. In addition, thicker layers of the high solid material can be formed in a single application of the coating since bubble formation from the evaporation of organic acid and water is less of a concern.

A. Formation of Urethane Oligomers

First, an isocyanate terminated urethane oligomer is formed. This step can be carried out conventionally through reaction of polyisocyanates, especially diisocyanates and triisocyanates, with polyfunctional organic compounds having at least two active hydrogen atoms for reaction with the isocyanate functional groups. In general, the isocyanate functional groups should be in excess relative to the active hydrogen functional groups. The ratio of isocyanate functional groups to active hydrogen atoms preferably is from about 1.01:1 to about 5:1, and more preferably from about 1.1:1 to about 3:1.

Representative polyisocyanates include, for example, toluene diisocyanate, 4,4'-diphenyl diisocyanate, 4,4'-diphenylmethane diisocyanate, 4,4-diphenyl-ether diisocyanate, dianisidine diisocyanate, 1,5-naphthalene diisocyanate, p-phenylene diisocyanate, trimethylene diisocyanate, octadecylmethylene diisocyanate, 2-chloropropane diisocyanate, 4,4'-methylene-bis(phenyl isocyanate), isophorone diisocyanate, 1,6-hexamethylene diisocyanate, 4,4'-methylene-bis(cyclohexyl isocyanate), 4,4',4"-triphenyl-methane triisocyanate, 1,3,5-benzene triisocyanate, polymethylene poly(phenyl isocyanate), and mixtures thereof. Suitable polyisocyanates also include biurets such as the biuret of 1,6-hexamethylene diisocyanate sold as Tolanate HDB™ (Rhone-Poulenc, Shelton, Conn.) and isocyanurates such as the isocyanurate of 1,6-hexamethylene diisocyanates sold as Tolanate HDT™ (Rhone-Poulenc, Shelton, Conn.).

A variety of organic compounds have at least two active hydrogen atoms that are reactive with free isocyanate groups, including polyfunctional mercaptans, primary and secondary amines, carboxylic acids, alcohols and combinations thereof. Suitable poly-secondary amines include, for example, piperazine. Preferred polyols have a molecular weight from about 200 to about 7500. Suitable polyols include, for example, ethylene glycol, diethylene glycol, 1,3-propylene glycol, 1,4-butane diol, glycerol, trimethylolpropane, erythritol, pentaerythritol, polyethers such as poly(ethylene oxide) diol and poly(propylene oxide) diol, polylactones such as polycaprolactone, and polyhydroxypolyesters of polycarboxylic acids such as esters of succinic acid, adipic acid, azelaic acid, sebacic acid, phthalic acid, isophthalic acid, and teraphthalic acid with polyols such as ethylene glycol, diethylene glycol, 1,4-butane diol, trimethylolpropane, glycerol, erythritol, pentaerythritol, poly(ethylene oxide) diol, polyethyleneoxide/propylene oxide) diol, and poly (tetramethylene oxide) diol.

Suitable urethane oligomers can be formed with pure polyols, especially diols. Nevertheless, it can be advantageous to add a mixture of diols and triols. The incorporation of triols provides a more branched structure. When a mixture of diols and triols is used, the ratio of triols to diols preferably is from 0.05:1 to about 2:1 and more preferably from about 0.1:1 to about 1.25:1.

Preparation of the isocyanate functional polyurethane oligomers can be accomplished by a one-stage process. In this process, the reactants including at least one polyisocyanate compound and at least one polyol are mixed to initiate the reaction. The reaction can be carried out under anhydrous conditions at a temperature from about 50° C. to about 80° C. for several hours. The reaction to form the isocyanate functional polyurethane can be carried out in a melt or in solution. In other words, an inert organic solvent optionally can be added when forming the reaction mixture. Suitable organic solvents include, for example, methyl acetate, ethyl acetate, amyl acetate, acetone, methyl ethyl ketone, diethyl ketone, methylisobutyl ketone, dimethyl formamide, dioxane, and methyl pyrrolidone.

B. Amine-Terminated Urethane Oligomers

The isocyanate functional urethane oligomers can be reacted with at least one ketimine or polyketimine to form ketimine functional polyurethane oligomers. The ketimine and polyketiimines can be formed by reacting primary amines with a ketone as a removable protecting group. Ketones enter into a condensation reaction with the primary amine, where the carbonyl of the ketone combines with the two active hydrogens of the primary amine group to form water and a ketimine If the corresponding unprotected primary amines are reacted with the isocyanate functional polyurethanes, crosslinking occurs due to reaction of the amine groups with the isocyanates, which can result in gelation if sufficient cross inking takes place.

Appropriate mono- or poly-primary amines have another reactive hydrogen that does not react with the ketone, for example a secondary amine, a hydroxyl or a thiol group. In other words, the primary amine can be a monosecondary amino, monohydroxy, or monothio substituted, mono- or polyfunctional primary amine. The ketimine has the general formula:

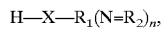

where n is at least one and where X can be O (hydroxyl), $NR_3$ (secondary amine) or S (thiol). $R_2$ is the residue of the ketone that is formed into the ketimine. $R_1$ can be an aliphatic, cycloaliphatic, heterocyclic or aromatic hydrocarbon moiety, and may be saturated or unsaturated. $R_1$ can be extensively branched and can bear one or more additional ketimine functional groups. $R_1$ contains preferably 2–8 carbon atoms and more preferably 2–4 carbon atoms. $R_3$ can be an aliphatic, cycloaliphatic, heterocyclic or aromatic hydrocarbon moiety, and can be saturated or unsaturated. $R_3$ can be bonded to $R_1$ to form a heterocyclic structure. $R_3$ contains preferably 1–8 carbon atoms and more preferably 1–4 carbon atoms. There are few examples of commercially available monosecondary amino, monoprimary amines. Suitable commercially available compounds include, for example, N-(ω-aminoalkyl)-substituted diazacyloalkanes or alkenes such as N-(aminoethyl)piperazine and N-alkyl-1,ω-diaminoalkanes such as N-methyl-1,3-propanediamine. Similarly, commercially-available monosecondary amino, polyfunctional primary amines are likewise few in number. Two examples of commercially available compounds containing two primary amine groups and one secondary amine group are diethylene triamine (D.E.H. 20™, Dow Chemical, Midland, Mich.) and bis(hexamethylene)triamine (DuPont, Wilmington, Del.).

Examples of suitable monohydroxy, monoprimary amines include, for example, monoethanolamine, monoisopropanol amine, and 3-amino-1-propanol. Suitable monohydroxy, polyfunctional primaryamines include, for example, 1,3-diamino-2-hydroxypropane. Monothio-, mono- or polyfunctional primary amines can be prepared by the reaction of hydrogen sulfide or certain mercaptans with unsaturated monoamines such as alkyl amines including, for example, butenyl amines and cyclohexenyl amine. Examples of useful mercaptans for these syntheses include, for example, 1,3 propanedithiol, 1,4 butanedithiol, and 1,4 benzenedithiol.

Suitable ketones for forming the ketimine include, for example, acetone, methyl ethyl ketone, diethyl ketone, methyl isobutyl ketone, dibutyl ketone, diisobutyl ketone, methyl isopropyl ketone, methyl octyl ketone, ethyl butyl ketone, and dioctyl ketone. The ketimines or polyketimines can be prepared, for example, according to the methods disclosed in U.S. Pat. No. 3,291,775 or as described in the examples below.

Note that the product water can be removed, for example by evaporation, to increase the formation of ketimine If the water is not removed, a proportion of the primary amine remains unprotected. This unprotected primary amine along with the additional reactive hydrogen in the molecule can react with isocyanate groups to crosslink the urethane oligomers. Generally, reaction with the primary amines results in a lower crosslinking density since amide formation can prevent full crosslinking with both active hydrogens of the primary amine. As noted below, crosslinking density affects the properties of the resulting polymer and coating formed from the polymer. On the other hand, the primary amines react quickly with the isocyanate groups such that the material very quickly can become too viscous to handle easily if the primary amine concentration is too high. Nevertheless, since the ketone can be present in a large excess, the presence of product water may not result in a sufficiently large quantity of free primary amine to significantly crosslink the urethane oligomers.

The ketimines or polyketimines are reacted with the isocyanate functional urethane oligomers to form ketimine functional urethane oligomers. The active hydrogen associated with the X-H group of the ketimine or polyketimine reacts with an isocyanate functional group. The resulting compounds are ketimine or polyketimine terminated urethane oligomers represented by the formula:

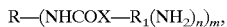

$$R-(NHCOX-R_1(N=R_2)_n)_m,$$

where R is the urethane oligomer backbone and m is the number of isocyanate functional groups in the original urethane oligomer. X, $R_1$, $R_2$ and n are defined above.

Generally, approximately one equivalent of ketimine composition is added per isocyanate (NCO) equivalent of urethane oligomer. If the ratios of equivalents are not one-to-one, there may be unreacted isocyanates or active hydrogen groups that contribute to any later crosslinking reaction, resulting in an overall reduction in crosslinking density. Preferably, the ratio of equivalents of ketimine to NCO ranges from about 0.7 to about 1.3, and more preferably from about 0.8 to about 1.2.

To complete formation of the primary amine-terminated urethane oligomers, the ketone protecting groups are removed by hydrolyzing the ketimine. One way of accomplishing this hydrolysis is though addition of excess water and a volatile organic acid. Addition of excess water and a volatile organic acid results in formation of an aqueous dispersion of the amine-cerminated urethane oligomers. The organic acid is used to protonate the amine groups to assist with the dispersion of the compound in water.

It has been discovered that a second way can be used to perform the hydrolysis. In this second approach, a smaller amount of water can be added to the ketimine terminated urethane oligomers. The smaller amount water hydrolyzes the ketimine to form the primary amine without formation of an aqueous dispersion. The resulting amine-terminated urethane oligomer has the formula:

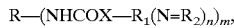

$$R-(NHCOX-R_1(NH_2)_n)_m,$$

where R, $R_1$, $R_2$, X, n and m are defined above. Since the resulting compound is not dispersed in water, a smaller quantity of volatile organic acid can be added as a viscosity modifier. Similarly, no organic acid can be added.

Following hydrolysis of the ketimine, the ketone is evaporated to yield a "melt" of the oligomer. In this way, a composition can be formed with very high proportions of amine-terminated urethane oligomers. After removal of the ketone, the composition generally comprises greater than about 55 percent by weight of the amine-terminated urethane oligomers, preferably from about 65 percent by weight to about 90 percent by weight and more preferably from about 70 percent by weight to about 80 percent by weight.

The added water can include miscible organic components that function as viscosity modifying agents. For example, a quantity of volatile organic acids, optionally, can be added. The composition generally includes less than about 10 percent, preferably less than about 1 percent, by mole equivalent of carboxylate groups of the volatile organic acids relative to all the amine groups (primary, secondary and tertiary) found in the amine-terminated urethane oligomers. Suitable organic acids include, for example, acetic acid. Other suitable miscible organic components include, for example, alcohols such as benzyl alcohol, n-butanol and isopropyl alcohol. When methyl ethyl ketone is used as the ketone protecting group, isopropyl alcohol is preferred since isopropyl alcohol forms an azeotrope with methyl ethyl ketone that assists with the removal of the ketone.

Effectively all or most of the ketone generally is removed from the composition since residual ketone can interfere with the eventual crosslinking reaction, although a small amount of ketone does not inhibit significantly the eventual crosslinking reaction. The final composition includes the amine-terminated urethane oligomer, any unreacted and unevaporated water, and any unevaporated organic solvent. The remaining water and organic solvent such as alcohol can act as plasticizers and/or viscosity modifiers. While the resulting amine-terminated urethane oligomer compositions have high viscosities, they are flowable. Therefore, they can be combined with a crosslinking agent to form a crosslinked polymer. Additional processing aids such as plasticizers and viscosity modifiers can be added to modify the properties of the composition. Similarly, additional additives can be added to a second component that is combined with the urethane oligomers to form a copolymer.

C. Crosslinked Urethanes (Copolymers)

The amine-terminated urethane oligomers can be reacted with a crosslinking agent to form a copolymer. Suitable crosslinking agents include, for example, monomers or oligomers with epoxy or acrylate functional groups. Suitable acrylate crosslinking agents include, for example, trimethylol propane triacrylate (TMPTA) and urethane acrylates. Epoxy based crosslinking agents are of particular interest.

Epoxy resins of interest contain at least one, but preferably more than one, 1,2-epoxy group of the formula:

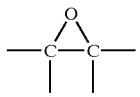

Suitable epoxy resins can be saturated or unsaturated, aliphatic, cycloaliphatic, aromatic, or heterocyclic. The epoxy resins have an average molecular weight preferably from about 100 to about 2000 and more preferably from about 140 to about 200. A selected epoxy resin can be supplied in the form of a solution in an organic solvent, water, or a combination of water and a water miscible organic solvent. Alternatively, the epoxy resin can be supplied in an unsolvated form, substantially free of organic solvent and water.

Examples of suitable epoxy resins include, for example, polyepoxides containing pendant and/or terminal 1,2-epoxy groups, such as the polyglycidyl ethers of polyphenols. Polyglycidyl ethers of polyphenols may be prepared, for example, by etherification of a polyphenol with epichlorohydrin or dichlorohydrin in the presence of base. Examples of suitable polyphenols include 1,1-bis(4-hydroxyphenyl) ethane, 2,2-bis(4-hydroxyphenyl)propane, 1,1-bis(4-hydroxyphenyl)isobutane, 2,2-bis(4-hydroxy-t-butylphenyl) propane, bis(2-hydroxy-1,5-dihydroxy)naphthalene, 1,1-bis (4-hydroxy-3-allyphenyl)ethane, and hydrogenated derivatives thereof. The polyglycidyl ethers of polyphenols of various molecular weights can be produced, for example, by varying the molar ratio of epichlorohydrin to polyphenol.

Useful polyepoxides also include, for example, the polyglycidyl ethers of mononuclear polyhydric phenols such as the polyglycidyl ethers of rescinol, pyrogallol, hydroquinone and pyrocatechol. Suitable epoxy resins also include the polyglycidyl ethers of polyhydric alcohols such as the reaction products of epchlorohydrin or dichlorohydrin with ($C_2$–$C_{20}$) aliphatic or cycloaliphatic compounds containing from two to four hydroxyl groups including, for example, ethylene glycol, diethylene glycol, triethylene glycol, dipropylene glycol, tripropylene glycol, propane diols, pentane diols, glycerol, 1,2-hexanetriol, pentaerythritol and 2,2-bis(4-hydroxy cyclohexyl)propane.

Suitable epoxy resins also include aliphatic, cycloaliphatic and glycidyl ether type 1,2-epoxides such as propylene oxide, styrene oxide, vinylcyclohexene dioxide, glycidol, butadiene oxide, glycidyl propionate, 3,4-epoxycyclohexylmethyl 3,4-epoxycyclohexane carboxylate, bis-(3,4-epoxy-6-methyl cyclohexyl methyl)adipate, dipentene oxide and poly(dimethylsiloxanes) having cycloaliphatic epoxide or glycidyl ether groups. Suitable polyepoxides additionally include polyglycidyl esters of polycarboxylic acids. Examples of which include polyglycidyl esters of bis(carboxylic acids such as adipic acid, phthalic acid and the like.

Polymerized resins containing epoxy groups can also be used. These polyepoxides can be produced by addition polymerization of epoxy functional monomers such as glycidyl acrylate, glycidyl methacrylate, and allyl glycidyl ether, optionally in combination with ethylenically unsaturated monomers such as styrene, alpha-methyl styrene, alpha-ethyl styrene, vinyl toluene, t-butyl styrene, acrylamide, methylacrylamide, acrylonitrile, methacrylonitrile, ethyl methacrylate, isobutyl methacrylate, isopropyl methacrylate, isobutyl methacrylate and isobornyl methacrylate. Many additional examples of useful epoxy resins are described in the Handbook of Epoxy Resins, H. Lee et al., eds., McGraw Hill Book Company (1967).

Stoichiometric blends of epoxy resins and active hydrogen bearing curing agents do not necessarily provide optimal polymer properties, especially for use as coatings. The ratio of 1,2-oxirane (epoxide) equivalency to active hydrogen equivalency from the primary amines of the urethane oligomers can be varied widely, and the resulting coatings exhibit a wide range of physical property differences. Note that each primary amine functional group is difunctional and capable of interacting with two epoxide groups. The ratio of 1,2-oxirane equivalency to active hydrogen equivalency can be varied from about 1:0.5 to 1:2 or higher.

Infrared analysis has shown that a slight excess of active hydrogen equivalency (about 0.9 equivalents of epoxide per active-hydrogen atom) is required to obtain complete disappearance of absorbance due to the 1,2-oxirane group. Active hydrogen equivalency can be evaluated using a direct measure of isocyanate equivalency and a theoretical estimate based on the amount of ketimine/primary amine added to form the ketimine functionalized urethane oligomers. The quantities of active-hydrogen atoms necessary to obtain complete disappearance of the 1,2-oxirane functionality can be referred to as the "optimal" quantity. At "optimum" blend ratios, the polymeric coating is nearly completely cross-linked.

As the ratio of active hydrogen atoms is increased above optimum, some of the active hydrogen atoms do not react with the epoxide groups. Excess active hydrogen atoms result in a degree of linearity, in other words a reduction in the cross-linking density in the cured polymer. Increasing the amount of amine active hydrogens above the level found to react with all of the 1,2-oxirane groups can provide a polymer with increased flexibility and decreased hardness and brittleness. Other properties can deteriorate if the mix ratio of the oligomer components are not selected properly. For example, tensile strength can drop rapidly while water, chemical and abrasion resistance can be reduced. These property differences may be due to molecular configurations in the cured polymer that vary according to the amount of the excess active hydrogen atoms. As noted above, crosslinking of isocyanate groups by unprotected primary amine combined with the ketimine also can result in a reduced crosslinking density.

Consequently, the characteristics of the oligomers and their ratios can be manipulated to produce desired properties. Typical polyurethane properties can be built into the urethane oligomer. Larger urethane oligomers with slight to moderate branching are preferred. Reduced branching of the urethane oligomers generally results in a more pliable coating. Urethane oligomers preferably have an average molecular weight from about 400 to about 1200. The polyurethane-like character can be enhanced by restricting the amount of epoxide oligomer curing agent by using a lower molecular weight epoxy.

If a suitable urethane oligomer is selected, the physical properties of the urethane/epoxy copolymer do not degrade as the active hydrogen atom/epoxide ratio exceeds stoichiometric, i.e., "optimal," values. The urethane-like properties of high abrasion resistance and gloss retention are generally observed at blending ratios of 1.25–1.75 active hydrogen equivalents per epoxide. In certain cases, properties continue to improve as the active hydrogen equivalent per epoxide ratio is increased to 2:1. When active hydrogen per epoxide ratios are within the range of 1.25–1.75, the copolymer formed with larger urethane oligomers exhibits water resistance typical of films obtained with essentially stoichiometric blends. The water resistance of the cured polymers starts to decline as the active hydrogen atom/epoxide ratio approaches and exceeds 2:1.

Urethane-epoxy blends generally exhibit a limited pot life of a few minutes to several hours after combining the components, for film or coating formation. Pot life has been associated with an increase in viscosity due to formation of the copolymer. When the viscosity has increased to the point that application becomes difficult and adverse film appearance characteristics cannot be avoided, the effective pot life of the blend is considered exceeded.

For optimal cure conditions, the urethane oligomer composition and epoxy resin should be between about 60° F. and about 100° F., and more preferably between about 70° F. and about 90° F. Premeasured quantities of the urethane oligomer composition and the epoxy resin can be poured into a clean container and blended thoroughly, for example, using a power mixing paddle or agitator, such as a Jiffy Mixer (distributed by Jiffy Mixer Company, Inc., San Francisco, Calif.) using a high strength industrial drill at low speed for a minimum of 5 minutes. Following mixing, the polymer is ready for the formation of coatings and the like.

D. Packaging and Distribution

Generally, the amine-terminated urethane oligomers and epoxy resins or other crosslinking composition are packaged and stored in separate containers awaiting use. Due to limited pot life, the two components of the copolymer are generally mixed at the site for curing of the copolymer. For distribution, the amine-terminated urethane oligomers and the epoxy resins preferably are packaged in containers with premeasured quantities suitable for mixing. In other words, the contents of the urethane oligomer container are mixed with the contents of the epoxy resin container to form a copolymer mixture with desired characteristics. This packaging in suitably measured quantities provides for easy preparation of the crosslinked copolymer without the need for the end user to measure desired amounts of the components of the copolymer.

The two premeasured components can be placed in a single package, such as a box or different portions of a divided package, for distribution. Alternatively, the different containers can be shipped in separate packaging along with a instruction label indicating that one container is to be mixed with the contents of the other container.

E. Coatings

The urethane/epoxy copolymers described above are particularly useful for the formation of coatings. The copolymers are preferably cured at ambient temperatures following application to a substrate. Alternatively, films of the blends can be heated to speed the crosslinking process. To form the coating, the two components of the copolymer generally are mixed, stirred and spread. Preferred substrates include concrete and wood surfaces such as floors and walls.

To form a floor coating, for example, the blend can be applied using a roller from a pan, or poured onto the floor in a windrow fashion and leveled using a squeegee. The coating can be spread, for example using a notched squeegee. Alternatively, the copolymer can be spread using a screed box to apply the material at a desired thickness over the substrate. The spread copolymer can be backrolled with a nap roller, if desired, to smooth any imperfections. The copolymer can be mixed with sand or the like to form a mortar prior to application to a surface.

Due to the high solids concentrations, i.e. low solvent concentrations, the present urethane/epoxy mixtures generally can be applied at greater thicknesses without adversely affecting the curing properties. In particular, the urethane oligomer/epoxy oligomer blends can be applied to a surface at a thickness of greater than about 1 mil, preferably from about 2 mils to about 200 mils. Thicker systems tend to be applied as mortar to repair eroded concrete.

Since a relatively large amount of volatile organic acid is not used to form a water emulsion, the curing rate does not depend on the rate of evaporation of the volatile organic acid. Generally, even when applied at relatively large thicknesses, the urethane/epoxy copolymer are dry to the touch within about 24 hours to about 48 hours. Generally, two weeks are required for complete curing of epoxies.

F. Coating Properties

While the properties of the final copolymers are influenced by the crosslinking agent, the urethane components have a significant influence on the properties of the resulting copolymer. Perhaps the predominant performance feature of polyurethane coatings that distinguishes them from other industrial/architectural coatings is their "toughness." The Paint/Coatings Dictionary, published by the Federation of Societies for Coatings Technology, 1978, defines toughness as "that property of a material by virtue of which it can absorb work." "Brittle" is defined in the same dictionary as "the opposite of tough." Abrasion resistance is a commonly measured property in the protective coatings industry and is closely related to toughness since it measures the work absorbing capacity of a coating. If desired, toughness can be defined as the abrasion resistance.

Various of techniques to evaluate abrasion resistance of protective coatings are published by ASTM. ASTM Method D-4060-81, "Abrasion Resistance of Organic Coatings by the Taber Abraser," is perhaps the most widely used. Abrasion resistance is determined by this test in terms of milligrams (mg) of coating loss per 1000 cycles of wear as applied by a Taber Abraser. A lower value of mgs of coating lost generally indicates a greater ability of the protective coating to resist abrasion.

It should be noted, however, that coatings that are very soft and extensible, but yet resilient, can yield low abrasion resistant values, indicative of good abrasion resistance, under the ASTM D-4060-81 test while the coatings are too soft to be useful as protective coatings for many applications. Thus, depending on the overall performance requirements of the coating system, a coating with the lowest abrasion resistance values under the ASTM D-4060-81 test may not have desired performance characteristics. Therefore, it is useful to combine measurements of abrasion resistance under the ASTM D-4060-81 test with measurements such as tensile strength and hardness. A coating product intended for use as an industrial floor coating must have sufficient tensile or cohesive strength to resist scratching, and sufficient hardness to resist dirt collection from industrial traffic.

Film hardness can be evaluated in accord with ASTM Method D-4366-84, "Hardness of Organic Coatings by Pendulum Damping Tests." ASTM D-4366-84 describes the use of a König hardness tester. ASTM D-4366-84 is a preferred hardness test since surface imperfections have little influence on the resulting hardness measurements. Under ASTM D-4366-84, "König hardness" is defined as the "time in seconds for the swing of the König pendulum to decrease from 6° to 3°." The König hardness tester is calibrated on plate glass to yield a value of 250±10 seconds.

Tensile strength and elongation can be measured following the procedures found in ASTM D 2370-92. For the tests, a copolymer film is produced as a free film with a uniform thickness. The free film is formed by casting the copolymer onto a non-stick plastic board. A tensile tester from Instron (Canton, Mass.) is used. After completely drying, the substrate is removed from the board. The copolymer film is cut to the dimensions specified in the protocol and is placed in the jaws of the tensile tester. The tensile tester was set to have an elongation rate of 2 inches per minute. The film was elongated until rupture of the film. The tensile strength was determined first by the stress in pounds per square inch (cross sectional area) required to reach the yield point where the elongation as a function of stress reaches a maximum and second by the stress required to rupture the film. Urethane films tend to stretch prior to breaking in contrast with epoxy films that are more brittle. Elongation was determined as the percent elongation at the breaking point.

For the measurements reported in the examples below, abrasion resistance was measured following ASTM D-4060-81 using a Taber Abraser, König hardness was measured following ASTM D-4366-84, and tensile strength and elongation were measured following ASTM D 2370-92.

EXAMPLES

Example 1
Formation of Urethane Oligomer

Initially, a 254.48 g quantity of toluene diisocyanate (TDI) and a 330 g quantity of methyl ethyl ketone (MEK) were placed in a glass reaction flask. The TDI and MEK were bathed continuously with an inert nitrogen atmosphere while being stirred gently in the flask. The reaction flask was gently heated to a temperature of 140° F. At a temperature of about 125° F., 34.84 g of solid 2-ethyl-2-(hydroxymethyl)-1,3-propanediol (TMP) were added to the reaction flask. After addition of the TMP, 434.2 g of polytetramethylene glycol (PM-650) (average molecular weight 672 for the particular lot) were added gradually to the reaction flask with an addition funnel.

With the addition of the TMP and PM-650, the exothermicity of the reaction required cooling of the flask to maintain the flask at the desired reaction temperature of about 140° F. Upon completion of the addition of the PM-650, the glass addition funnel was rinsed with 50 g of MEK, which was then added to the reaction flask. When the temperature dropped below 140° F., the flask was heated to maintain the temperature near 140° F. The reaction was continued at or near 140° F. for about 4–6 hours for completion of the prepolymer reaction.

Toluene diisocyanate (TDI) has two functional isocyanate groups yielding an equivalent weight of 87 based on a molecular weight of 174. TMP has three hydroxy groups corresponding to an equivalent weight of about 44.67. PM-650 has two hydroxy groups corresponding to an equivalent weight of about 334. Based on the quantities added above and the noted equivalent weights, the equivalents of TDI, TMP and PM-650 added were, respectively, 2.925, 0.780 and 1.3. This corresponds to relative equivalents of TDI:TMP:PM-650 of 2.25:0.60:1.00.

The MEK (370 g) was the only significant volatile component of the composition. A total of 1093.52 g of urethane oligomer solution was recovered. The remaining compounds (theoretically 723.52 g) were non-volatile. The weight percentage of the non-volatile components based on the theoretical estimate was 723.52/1093.52=66.16%. The weight percentage of the non-volatile component as determined with the method of ASTM D 2369-90 was 66.97%. The remaining, unreacted NCO functional groups were evaluated according to ASTM procedure ASTM D-1638-74, sections 86–92. In this procedure, to determine the number of NCO functional groups (i.e., amine equivalent), excess di-n-butylamine was added to form a urea by reaction with the isocyanate groups. The quantity of excess amine was determined by titration with a standard solution of hydrochloric acid. The NCO or amine equivalent can be defined as the weight of sample that reacts with one equivalent of dibutylamine. The oligomer equivalent weight was determined by dividing 100×equivalent weight NCO by the percent NCO.

For the above sample, the percent NCO as a portion of solids was 5.09%. Estimating the percent NCO using the quantities of material added and assume complete reaction yields 5.16%. The percent NCO as a portion of solution was 3.41%. The oligomer of the sample had an equivalent weight of (42.02×100)/3.41=1232 g/eq.

The representative procedure of Example 1 was repeated for the formation of additional urethane oligomers. The reactants and characteristics of these other urethane oligomers are tabulated in Table 1.

TABLE 1

Urethane Oligomers

| UO ID No. | TDI/TMP/DIOL (by equivalence) | NCO/OH | DIOL | NCO-EW (Solu.) | NCO-EW (Solids) |
|---|---|---|---|---|---|
| 1 | 2.0/0.0/1.0 | 2.00 | PM-650 | 895.9 | 610 |
| 2 | 2.0/0.0/1.0 | 2.00 | KF-320 | 630 | 323 |
| 3 | 3.0/0.0/1.0 | 3.00 | PM-650 | 424 | 252 |
| 4 | 2.2S/0.0/1.0 | 2.25 | PG-S5 | 643 | 369 |
| 5 | 2.5/0.0/1.0 | 2.50 | PG-SS | 609 | 310 |
| 6 | 2.8/0.3/1.0 | 2.15 | PM-650 | 652 | 371 |
| 7 | 2.55/0.3/1.0 | 1.96 | PM-650 | 703 | 451 |
| 8 | 2.3/0.3/1.0 | 1.77 | PM-650 | 834 | 557 |
| 9 | 2.55/0.6/.7 | 1.96 | PG-55 | 576 | 366 |
| 10 | 2.3/0.3/1.0 | 1.77 | PG-55 | 788 | 523 |
| 11 | 2.55/0.5/.8 | 1.96 | PM-650 | 634 | 405 |
| 12 | 2.55/0.3/1.0 | 1.96 | PG-55 | 632 | 416 |
| 13 | 2.55/0.4/1.1 | 1.70 | PM-650 | 649 | 56S |
| 14 | 2.25*/0.25/1.0 | 1.8 | PM-650 | 886 | 592 |
| 15 | 2.25*/0.14/1.0 | 1.97 | PM-650 | 791 | 523 |
| 16 | 2.25**/0/1.0 | 2.25 | PM-650 | 834 | 528 |

UO ID N0. = isocyanate terminated urethane oligomer identification number.
TDI = toluene diisocyanate (Rhone-Poulenc, Shelton, CT) except as specifically indicated.
TMP = 2-ethyl-2-(hydroxymethyl)-1,3-propenediol (Perstorp, Toledo, OH).
PM-650 = polytetramethylene glycol (EW = 324, Great Lakes Chemical, Lafayette, IN).
KF-320 = K-flex UD320, urethane diol (EW = 160, King Industries, Norwalk, CT).
PG-55 = Poly G55-1731 ethylene oxide terminated polypropylene glycol (EW = 324, Olin Corp., Stamford, CT).
NCO/OH = ratio of NCO equivalents to OH equivalents.
NCO-EW (Solu.) = equivalent weight of urethane oligomer in solution based on NCO functionality prior to reaction with ketimine.
NCO-EW (Solids) = equivalent weight of urethane oligomer with solvent removed, based on NCO functionality prior to reaction with ketimine.
*Isophorone Diisocyanate (Vestanate IPD ™, Creanova Corp., Somerset, NJ) substituted for TDI.
**Methylene diisocyanate (Isonate 143L ™, Dow Chemical, Midland, Mi) substituted for TDI.

Example 2
Preparation of Ketimine

A ketimine was formed to later react with the isocyanate functionalized urethane oligomer. To form the ketimine, 92.81 g of aminoethyl piperazine (AEP) and 207.19 g of MEK were added to a flask and left to react for a couple of hours.

AEP has one functional primary amine for an equivalent weight of 129. Similarly, MEK has one equivalent per molecular for an equivalent weight of 72. It follows that a significant excess of MEK was added to reduce the amount of unreacted AEP. In particular, a three fold excess by equivalence of MEK was added. The product was analyzed by gas chromatography. From GC analysis, the ratios of equivalents of ketimine to AEP (unreacted) was 95/5.

If all of the AEP reacted to form ketimine, 417 g of the composition (including solvent) would correspond to 1 equivalent, and the equivalent weight would be 417 g. Any unreacted AEP, however, has two equivalents per molecule since it can react with an isocyanate at both the primary amine and the secondary amine. Assuming that 95 percent of the AEP has formed ketimine, 5 percent remains as unreacted AEP. Similarly, with 417 g corresponding to about 1.05 equivalents, the equivalent weight was about 399.

Example 3
Formation of Ketimine Terminated Urethane Oligomer

The prepolymer was separated into two equal parts. One part (485 g) of the urethane oligomer was added to a glass addition funnel. A 147.63 g quantity of ketimine/AEP product was placed into a 2000 ml reaction flask and gently stirred. After a couple of minutes of stirring, the urethane prepolymer was added to the reaction flask in a steady stream while stirring was continued. The exothermic nature of the reaction resulted in heating of the reaction flask to a temperature between 130° F. and 140° F. during the addition of the urethane oligomer. As the viscosity of the composition in the reaction flask increased during addition of the urethane oligomer, the mixing rate was increased to maintain a satisfactory mix rate. The addition of urethane oligomer was completed after about 5–10 minutes. The addition funnel was then rinsed with about 25 ml of MEK, which was subsequently added to the reaction flask. The reaction was terminated following addition of the rinse solution.

The percent non-volatiles was determined by heating a sample or the reaction product in a dish at 220° F. for one hour. Again using the procedure of ASTM D 2369-90, from a 0.6965 g portion, 56.86% of the sample remained after heating and from a 0.6552 g sample 56.67% remained. Estimating the percent nonvolatilves based on the quantities of reactants, assuming complete reaction, yields 56.77%.

Example 4
Formation of Amine-Terminated Urethane Oligomer

A 655.7 g quantity of the ketimine functionalized urethane oligomer composition was placed in a flask. Based on the average non-volatile content, 372.24 g of material in the flask was non-volatile. A 33.50 g quantity of water and 178.68 g quantity of iso-propyl alcohol were added to the flask. The mixture was stirred for about 15 minutes to ensure complete mixing. The water hydrolyzed the ketimine to remove the ketone protecting group, thereby converting the ketimine to an unprotected primary amine.

The mixture then was placed a rotary evaporation flask for removal of released MEK by rotary evaporation. The flask was heated to a temperature from about 50° C. to about 55° C. under vacuum for about a half hour. A total of 337.85 g of solvent was removed. It is assumed that essentially all of the methyl ethyl ketone was removed. The initial solvent removed was 70/30 mixture of MEK/IPA corresponding to the azeotrope.

The percent non-volatiles (ASTM D 2369-90) in the final amine-terminated urethane oligomer was determined by placing a two small samples (0.8115 g and 0.7165 g) in a dish and heating to about 220° F. for about 2 hours. The average of the two measurements (72.48% and 72.64%) yielded 72.56% non-volatiles.

The above representative procedure described in Examples 3–4 was repeated approximately for the production of other amine-terminated urethane oligomers. The reactants and characteristics of the resulting oligomers are summarized in Table 2.

TABLE 2

Amine-Terminated Urethane Oligomers

| ATUO ID No. | UO ID No. | Alcohol/Water | Viscosity | % Solids |
|---|---|---|---|---|
| 1 | 1 | 50–55% BzOH | | 59.47 |
| 2 | 2 | 57% BzOH | | 68.50 |
| 3 | 3 | 50% BzOH | | 60.40 |
| 4 | 4 | 4S% BzOH | | 63.30 |
| 5 | 5 | 40% BzOH | | 66.75 |
| 6 | 6 | 40% BzOH | | 65.96 |
| 7 | 7 | 40% BzOH | | 68.22 |
| 8 | 8 | 40% BzOH | | 63.97 |
| 9 | 9 | 40% BzOH | | 68.97 |
| 10 | 10 | 40% BzOH | | 67.20 |
| 11 | 11 | 40% BzOH | | 66.34 |
| 12 | 7 | 20% BzOH + 20% IPA | | 66.16 |
| 13 | 7 | 30% BzOH + 10% IPA | | 77.47 |
| 14 | 7 | 36% BzOH + 4% IPA | | 74.49 |
| 15 | 7 | 40% IPA | | 69.83 |
| 16 | 7 | 60% IPA | | 63.48 |
| 17 | 7 | post add 5% AEP + 10% BzOH | | |
| 17 | 7 | 20% BzOH + 20% n-butanol post add 5% AEP | | 69.17 |
| 18 | 7 | 30% BzOH + 10% n-butanol post add 5% AEP | | 67.38 |
| 19 | 1 | 40% BzOH | | 67.27 |
| 20 | 7 | 45% IPA + 12% water | | 67.00 |
| 21 | 7 | 45% IPA + 12% water post add 3% IPA + 10% BzOH | | 66.28 |
| 22 | 7 | 45% IPA + 17% water | | 72.37 |
| 23 | 7 | 45% IPA + 13% water | | |
| 24 | 1 | 45% IPA + 13% water | | 68.88 |
| 25 | 12 | 45% IPA + 13% water | | 72.91 |
| 26 | 13 | 47% IPA + 12% water | | 76.63 |
| 27 | 14 | 48% IPA + 9% water | 16900 | 77.67 |
| 28 | 15 | 48% IPA + 9% water | 12400 | 75.86 |
| 29 | 16 | 60% IPA + 9% water | | 68.36 |

ATUO ID No. = Identification Number for the Amine-Terminated Urethane Oligomer.
UO ID No. = Isocyanate terminated urethane oligomer identification number corresponding to numbers in Table 1.
Alcohol/Water = Weight percents added alcohol and/or water added to the ketimine terminated urethane oligomers based on weight of oligomer solids.
Viscosity = Brookfield Viscosity of amine-terminated urethane oligomers following removal of MEK as measured by ASTM D2196-86(1991).
% Solid = percent by weight of the non-volatile component of the amine-terminated urethane oligomer as determined following ASTM D2369-90.

Example 5
Copolymer

The amine-terminated urethane oligomers were ready for mixing with a epoxy resin, crosslinking agent. The two solutions were poured together and blended with a spatula or the like. The blend was then be applied as a three mil (wet) film to a glass substrate to determine the basic properties of the coating. Various blends that were prepared and their properties are summarized in Tables 3 and 4.

TABLE 3

Urethane/Epoxy Copolymers-König Hardness

| Cop | ATUO | | König Hardness | | | |
|---|---|---|---|---|---|---|
| ID No. | ID No. | BPAGE/Mono | Day 1 | Day 2 | Day 3 | Week 2 |
| 1 | 1 | 85/15 | 11 | 24 | 45 | 67 |
| 2 | 2 | 85/15 | 9 | 21 | 43 | 58 |

TABLE 3-continued

Urethane/Epoxy Copolymers-König Hardness

| Cop ID No. | ATUO ID No. | BPAGE/Mono | König Hardness | | | |
|---|---|---|---|---|---|---|
| | | | Day 1 | Day 2 | Day 3 | Week 2 |
| 3 | 3 | 85/15 | 21 | 56 | 69 | 97 |
| 4 | 4 | 85/15 | 12 | 17 | 26 | 46* |
| 5 | 5 | 85/15 | 16 | 21 | — | 74* |
| 6 | 6 | 92/8 | 20 | 51 | 74 | 162 |
| 7 | 7 | 85/15 | 22 | 42 | 71 | 140 |
| 8 | 7 | 92/8 | 20 | 44 | 71 | 153 |
| 9 | 8 | 85/15 | 19 | 36 | 53 | 123 |
| 10 | 8 | 92/8 | 12 | 32 | 48 | 140 |
| 11 | 9 | 92/8 | 14 | 28 | 45 | 123 |
| 12 | 10 | 92/8 | 11 | 12 | 16 | 65 |
| 13 | 7 | 85/15 | 14 | 28 | 49 | 137 |
| 14 | 7 | 8S/15 | 13 | 30 | 57 | 135 |
| 15 | 7 | 92/8 | 13 | 23 | 41 | 137 |
| 16 | 7 | 92/8 | 13 | 23 | 41 | 126 |
| 17 | 11 | 85/15 | 14 | 28 | 47 | 138 |
| 18 | 11 | 92/8 | 15 | 29 | 45 | 134 |
| 19 | 7 | 85/15 | 23 | 48 | 77 | 147 |
| 20 | 7 | 92/8 | 26 | 46 | 78 | 155 |
| 21 | 13 | 85/15 | 38 | 63 | 84 | 144 |
| 22 | 13 | 92/8 | 39 | 71 | 86 | 148 |
| 23 | 14 | 85/15 | 48 | 77 | 91 | 142 |
| 24 | 14 | 92/8 | 47 | 78 | 92 | 150 |
| 25 | 15 | 85/15 | 62 | 82 | 95 | 142 |
| 26 | 15 | 92/8 | 59 | 88 | 104 | 152 |
| 27 | 19 | 92/8 | 13 | 24 | 39 | 125 |
| 28 | 20 | 92/8 | 19 | 30 | 48 | 147 |
| 29 | 21 | 92/8 | 14 | 20 | 35 | 143 |
| 30 | 22 | 92/8 | 73 | 100 | 106 | 154 |
| 31 | 24 | 92/8 | 60 | 70 | 77 | 139 |
| 32 | 2S | 92/8 | 41 | 51 | 57 | 140 |
| 33 | 26 | 92/8 | 59 | 83 | 98 | 146 |
| 34 | 26 | 85/15 + 1.7% BZOH | 55 | 77 | 90 | 136 |
| 35 | 27 | 92/8 | 40 | 76 | 99 | 134 |
| 36 | 28 | 92/8 | 41 | 75 | 100 | 137 |
| 37 | 29 | 92/8 | 67 | 89 | 112 | 155 |

Cop ID N0. = Copolymer identification number.
ATUO ID N0. = Amine-terminated urethane oligomer identification number corresponding to values in Table 2.
BPAGE/Mono = Relative proportions by weight of diglycidyl ether of bisphenyl A (BPADGE, EW 185-192, EPON 828 ™, Shell Chemical, Houston, TX) and monofunctional Epoxide 8 (C12–C14 monoglycidal ether of C12–C14 alcohol, EPOTUF 37-058, Reichold Chemical, Research Triangle Park, NC) to produce a 1:1 equivalence ratio with the amine-terminated urethane oligomer. The final copolymer included 1.7 percent by weight benzyl alcohol.
König Hardness: as measured 1 day, 2 days, 3 days or two weeks following application of the coating.

TABLE 4

Urethane/Epoxy Copolymers-Additional Properties

| Cop ID No. | 2 Wk Taber | Tensile Strength | % Elong. Range |
|---|---|---|---|
| 1 | 12 | 3800 | 5600 |
| 2 | 64 | 3000 | 6300 |
| 3 | 33 | 2600 | 4900 | 10–40 |
| 7 | 49 | | |
| 8 | 31 | | |
| 9 | 33 | | |
| 10 | 28 | | |
| 11 | 57 | | |
| 12 | 26 | | |
| 21 | 29 | | |
| 22 | 26 | | |
| 23 | 27 | | |
| 24 | 27 | | |
| 25 | 31 | | |
| 26 | 33 | | |
| 30 | 32 | 4600 | 6700 | 10 |

TABLE 4-continued

Urethane/Epoxy Copolymers-Additional Properties

| Cop ID No. | 2 Wk Taber | Tensile Strength | % Elong. Range |
|---|---|---|---|
| 31 | 22 | 2300 | 3400 | 5–10 |
| 32 | 33 | 2200 | 4800 | 5–10 |
| 33 | 34 | 3700 | 5800 | 5–10 |
| 34 | 24 | 3100 | 5200 | 10–20 |
| 35 | 44 | | |
| 36 | 39 | | |
| 37 | 29 | | |

Cop ID No. = Copolymer identification number.
2 Wk Taber = Abrasion resistance measured using a Taber Abrasor, 2 weeks after application of the coating.
Tensile Strength = Average tensile strength measured following ASTM D 2370-92 in pounds per square inch generally based on at least six independent measurements.
% Elong. = Percent elongation measured following ASTM D 2370-92.

Example 6
Systematic Study of Urethane-Epoxy Coating Properties

In this example, the properties of urethane-epoxy coatings similar to those described above are systematically studied. In particular, the urethane oligomers are varied along with the relative amounts of ketimine and epoxy resin.

The procedures followed to produce these coatings were comparable to those described in the preceding examples. All of the urethane oligomers were produced using a ratio of 2.25 TDI/1.0 PM-650 by equivalence. The amounts of triol TMP was varied as indicated. Ketimine was prepared as described in Example 2. The amine terminated urethane oligomers produced are summarized in Table 5.

TABLE 5

| ATUO ID No. | TMP (eq) | NCO/Ket | % NV | cps | aew (sol'n) |
|---|---|---|---|---|---|
| 6-1 | 0.00 | 0.877 | 78.44 | 141,000 | 442 |
| 6-2 | 0.00 | 0.940 | 73.18 | 22,700 | 448 |
| 6-3 | 0.00 | 1.000 | 77.84 | N/A | 376 |
| 6-4 | 0.00 | 1.065 | 75.11 | 22,900 | 370 |
| 6-5 | 0.14 | 0.877 | 75.3 | 75,500 | 516 |
| 6-6 | 0.14 | 0.940 | 72.76 | 50,300 | 507 |
| 6-7 | 0.14 | 1.000 | 72.28 | 12,700 | 437 |
| 6-8 | 0.14 | 1.065 | 71.24 | 12,400 | 419 |
| 6-9 | 0.25 | 0.877 | 75.73 | 70,000 | 506 |
| 6-10 | 0.25 | 0.940 | 78.57 | 103,000 | 466 |
| 6-11 | 0.25 | 1.000 | 71.22 | 25,700 | 468 |
| 6-12 | 0.25 | 1.065 | 73.64 | 25,200 | 432 |
| 6-13 | 0.40 | 0.877 | 74.84 | 107,000 | 611 |
| 6-14 | 0.40 | 0.940 | 72.93 | 47,400 | 588 |
| 6-15 | 0.40 | 1.000 | 76.53 | 58,100 | 499 |
| 6-16 | 0.40 | 1.065 | 70.27 | 36,600 | 506 |
| 6-17 | 0.60 | 0.877 | 74.72 | >100,000* | 759 |
| 6-18 | 0.60 | 0.940 | 72.56 | 118,000 | 727 |
| 6-19 | 0.60 | 1.000 | 71.07 | 65,800 | 657 |
| 6-20 | 0.60 | 1.065 | 69.44 | 39,100 | 630 |

*Apparatus did not yield accurate result.
ATUO ID-No. = Amine-terminated urethane oligomer identification number.
TMP(eq) = Equivalents of TMP added to form the urethane oligomer.
NCO/Ket = Theoretical ratio of equivalents of NCO and ketimine functionalities.
% NV = Theoretical estimates of percent nonvolatiles.
cps = Brookfield Viscosity in centipoise (ASTM D 2196-86 (1991).
aew (sol'n) = Amine equivalent weight in solution.

The amine terminated urethane oligomers were used to produce urethane-epoxy coatings, as described in Example 5. The epoxy resin used to produce the coating was 95% BPADGE and 5% Epoxide 8 by weight. The properties of the resulting coatings are summarized in Table 6.

TABLE 6

| ATUO ID-No. | eq NH/ eq epoxy | 1 day König | 2 day König | 3 day König | 1 wk König | 2 wk König | 1 wk Taber |
|---|---|---|---|---|---|---|---|
| 6-1 | 0.8 | 31 | 43 | 55 | 92 | 125 | 21 |
|  | 1 | 51 | 69 | 82 | 116 | 141 | 12 |
|  | 1.2 | 69 | 92 | 106 | 136 | 155 | 14 |
| 6-2 | 0.8 | 41 | 56 | 71 | 109 | 139 | 33 |
|  | 1 | 62 | 85 | 102 | 137 | 155 | 12 |
|  | 1.2 | 81 | 109 | 125 | 156 | 168 | 17 |
| 6-3 | 0.8 | 32 | 46 | 92 | 140 | 157 | 27 |
|  | 1 | 48 | 76 | 123 | 155 | 165 | 19 |
|  | 1.2 | 60 | 92 | 141 | 161 | 168 | 16 |
| 6-4 | 0.8 | 40 | 60 | 108 | 147 | 166 | 40 |
|  | 1 | 60 | 87 | 136 | 158 | 171 | 23 |
|  | 1.2 | 63 | 96 | 146 | 165 | 168 | 15 |
| 6-5 | 0.8 | 30 | 46 | 64 | 97 | 125 | 21 |
|  | 1 | 22 | 42 | 75 | 108 | 132 | 22 |
|  | 1.2 | 57 | 88 | 111 | 139 | 155 | 19 |
| 6-6 | 0.8 | 29 | 50 | 72 | 109 | 135 | 29 |
|  | 1 | 48 | 79 | 102 | 135 | 155 | 19 |
|  | 1.2 | 61 | 96 | 122 | 148 | 165 | 18 |
| 6-7 | 0.8 | 43 | 64 | 83 | 126 | 152 | 32 |
|  | 1 | 58 | 87 | 107 | 146 | 161 | 26 |
|  | 1.2 | 78 | 108 | 128 | 160 | 175 | 19 |
| 6-8 | 0.8 | 42 | 73 | 89 | 134 | 159 | 44 |
|  | 1 | 65 | 100 | 118 | 153 | 168 | 27 |
|  | 1.2 | 81 | 119 | 134 | 163 | 174 | 21 |
| 6-9 | 0.8 | 24 | 38 | 48 | 81 | 102 | 21 |
|  | 1 | 32 | 53 | 67 | 98 | 111 | 12 |
|  | 1.2 | 48 | 76 | 92 | 120 | 130 | 14 |
| 6-10 | 0.8 | 31 | 48 | 60 | 91 | 115 | 33 |
|  | 1 | 29 | 50 | 65 | 106 | 124 | 12 |
|  | 1.2 | 54 | 90 | 107 | 136 | 145 | 17 |
| 6-11 | 0.8 | 46 | 67 | 85 | 126 | 146 | 30 |
|  | 1 | 67 | 95 | 113 | 146 | 158 | 21 |
|  | 1.2 | 76 | 106 | 123 | 156 | 164 | 18 |
| 6-12 | 0.8 | 43 | 65 | 87 | 126 | 147 | 41 |
|  | 1 | 61 | 90 | 109 | 144 | 158 | 26 |
|  | 1.2 | 72 | 106 | 125 | 151 | 164 | 20 |
| 6-13 | 0.8 | 18 | 21 | 29 | 44 | 71 | 21 |
|  | 1 | 29 | 38 | 51 | 62 | 87 | 22 |
|  | 1.2 | 35 | 49 | 66 | 76 | 95 | 19 |
| 6-14 | 0.8 | 22 | 30 | 42 | 58 | 86 | 29 |
|  | 1 | 36 | 50 | 68 | 87 | 103 | 19 |
|  | 1.2 | 38 | 60 | 81 | 96 | 114 | 18 |
| 6-15 | 0.8 | 34 | 60 | 69 | 105 | 129 | 15 |
|  | 1 | 44 | 83 | 92 | 125 | 137 | 17 |
|  | 1.2 | 47 | 90 | 103 | 132 | 143 | 12 |
| 6-16 | 0.8 | 38 | 64 | 74 | 111 | 136 | 41 |
|  | 1 | 58 | 94 | 104 | 132 | 146 | 23 |
|  | 1.2 | 69 | 109 | 119 | 146 | 153 | 16 |
| 6-17 | 0.8 | 26 | 33 | 40 | 52 | 73 | 15 |
|  | 1 | 32 | 46 | 55 | 61 | 84 | 13 |
|  | 1.2 | 39 | 54 | 64 | 78 | 94 | 14 |
| 6-18 | 0.8 | 29 | 40 | 48 | 63 | 87 | 28 |
|  | 1 | 36 | 54 | 65 | 81 | 99 | 17 |
|  | 1.2 | 48 | 67 | 80 | 94 | 113 | 1 |
| 6-19 | 0.8 | 39 | 53 | 67 | 92 | 115 | 23 |
|  | 1 | 53 | 73 | 87 | 108 | 122 | 19 |
|  | 1.2 | 58 | 82 | 98 | 120 | 130 | 15 |
| 6-20 | 0.8 | 39 | 51 | 68 | 93 | 114 | 35 |
|  | 1 | 54 | 69 | 89 | 112 | 127 | 15 |
|  | 1.2 | 60 | 85 | 100 | 123 | 132 | 19 |

ATUO ID-No = Amine terminated urethane oligomer identification number.
eq NH/eq epoxy = Theroetical ratio of NH functional groups and epoxy functional groups.
König = König Hardness as measured 1 day, 2 days, 3 days, 1 week or two weeks following application of the coating.
1 wk Taber = Abrasion resistance measured using a Taber Abrasor, 1 week after application of the coating.

The embodiments described above are intended to be representative and not limiting. Additional embodiments of the invention are within the claims.

What is claimed is:

1. A kit comprising:
   a) a composition comprising greater than about 55 percent by weight amine-terminated urethane oligomers free of crosslinking between a terminal amine and an isocyanate linkage, and the composition being substantially free of ketones and aldehydes; and
   b) A polyepoxide compound in a container separate from said composition comprising amine-terminated urethane oligomers.

2. The kit of claim 1 wherein said polyepoxide is a polyglycidyl ether of a polyphenol, a polyglycidyl ether of aliphatic polyol with 2 to 4 hydroxyl groups, or mixtures thereof.

3. The kit of claim 1 wherein the ratio of active hydrogens in amine functional groups to epoxide groups ranges from about 1:1 to about 1.75:1.

4. A polymer coating comprising an epoxy crosslinked amine-terminated urethane polymer, said coating formed by curing a mixture of polyepoxides and a composition comprising greater than about 55 percent by weight amine-terminated urethane oligomers free of crosslinking between a terminal amine and an isocyanate linkage, wherein said mixture has ratio of active hydrogens to epoxide groups that ranges from 1.25:1 to about 2:1.

5. A method of forming a coating comprising the steps of spreading a mixture on a surface such that it can cure, the mixture being obtained by mixing polyepoxides with a composition comprising greater than about 55 percent by weight amine-terminated urethane oligomers free of crosslinking between a terminal amine and an isocyanate linkage, and the composition being substantially free of ketones and aldehydes.

6. The method of claim 5 wherein said surface comprises concrete.

7. The method of claim 5 wherein said surface is a floor or a wall.

8. The kit of claim 1 wherein the composition comprises from about 60 percent to 90 percent by weight amine-terminated urethane oligomers.

9. The kit of claim 1 wherein the composition comprises from about 65 percent to 80 percent by weight amine-terminated urethane oligomers.

10. The kit of claim 1 further comprising an aqueous viscosity modifying agent.

11. The kit of claim 10 wherein said aqueous viscosity modifying agent comprises greater than about 30 percent by weight volatile alcohol.

12. The kit of claim 1 further comprising volatile organic acids, said composition comprising less than about 1 percent by mole equivalent of carboxylate groups of said volatile organic acids relative to amine groups of said amine-terminated urethane oligomers.

13. The kit of claim 1 wherein said amine-terminated urethane oligomers comprise multifunctional amine moieties bonded at secondary amine sites to isocyante functional groups of a urethane oligomer to form urea linkages.

14. The kit of claim 13 wherein said multifunctional amine moieties comprise N-(aminoethly)piperazine moieties.

15. The kit of claim 1 wherein said amine-terminated urethane oligomers comprise amine moieties bonded at an oxygen atom to isocyanate functional groups of a urethane oligomer to form carbamate linkages.

16. The kit of claim 1 wherein said amine-terminated urethane oligomers are free of —NCON—$R_1$—NOCN— linkages between isocyanate groups, where $R_1$ is a hydrocarbon moiety.

17. The method of claim 5 wherein the composition comprises from about 65 percent to 80 percent by weight amine-terminated urethane oligomers.

18. The method in claim 5 further comprising an aqueous viscosity modifying agent.

19. The method of claim 18 wherein said aqueous viscosity modifying agent comprises greater then about 30 percent by weight volatile alcohol.

20. The method of claim 5 wherein said amine-terminated urethane oligomers comprise multifunctional amine moieties bonded at secondary amine sites to isocyanate functional groups of a urethane oligomer to form urea linkages.

* * * * *